Figure 1:
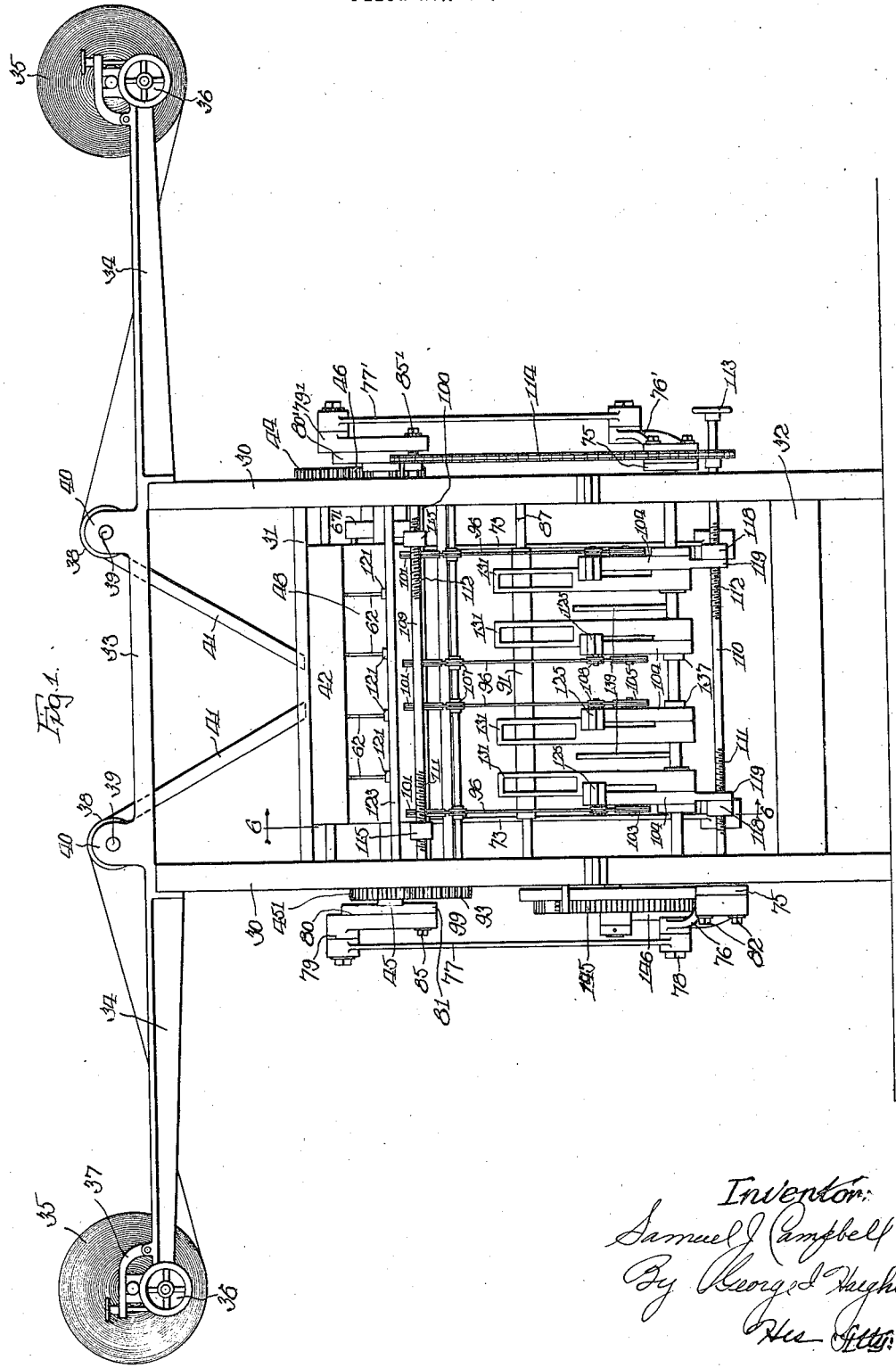

April 17, 1928.  1,666,086
S. J. CAMPBELL
ARTICLE FORMING AND FOLDING MACHINE
Filed Aug. 13, 1926  10 Sheets-Sheet 2

April 17, 1928. 1,666,086
S. J. CAMPBELL
ARTICLE FORMING AND FOLDING MACHINE
Filed Aug. 13, 1926 10 Sheets-Sheet 7

Inventor:
Samuel J Campbell
By George I Haight
His Atty.

April 17, 1928.
S. J. CAMPBELL
1,666,086
ARTICLE FORMING AND FOLDING MACHINE
Filed Aug. 13, 1926   10 Sheets-Sheet 8
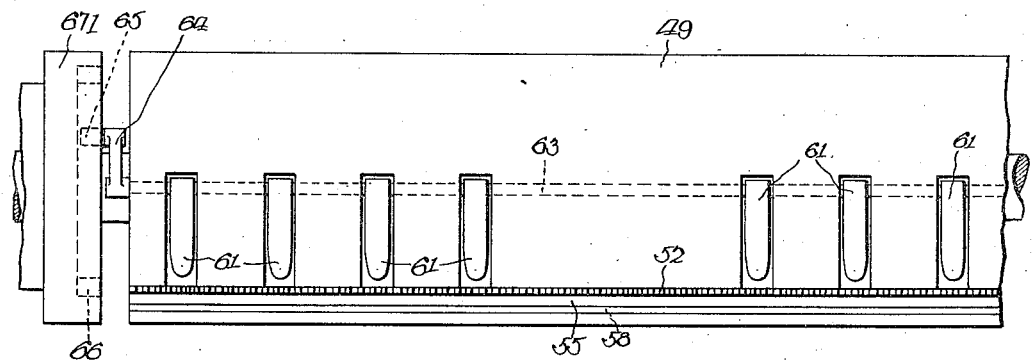
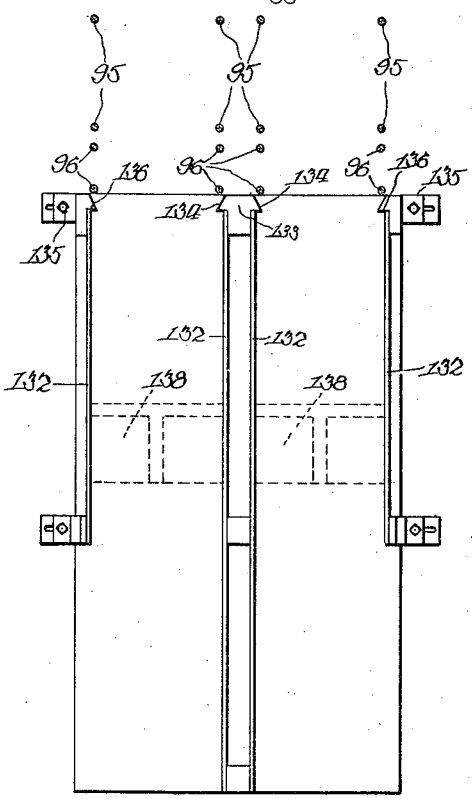

April 17, 1928.
S. J. CAMPBELL
1,666,086
ARTICLE FORMING AND FOLDING MACHINE
Filed Aug. 13, 1926      10 Sheets-Sheet 9
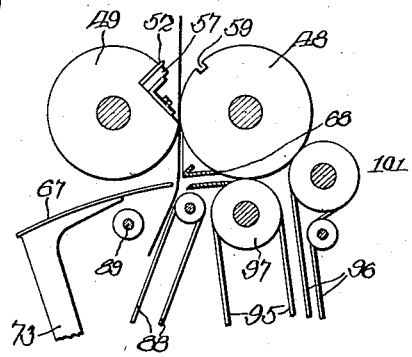
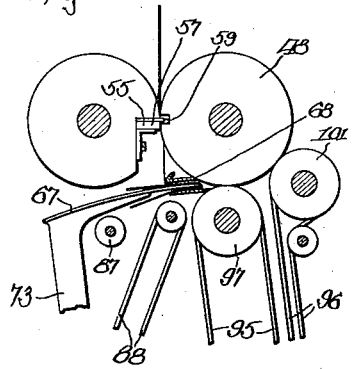
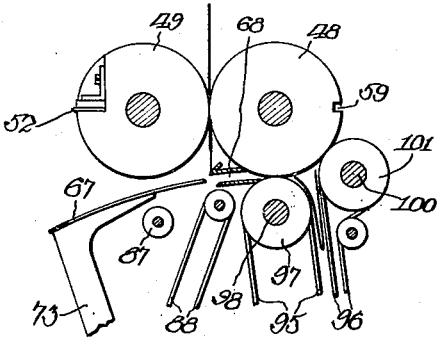
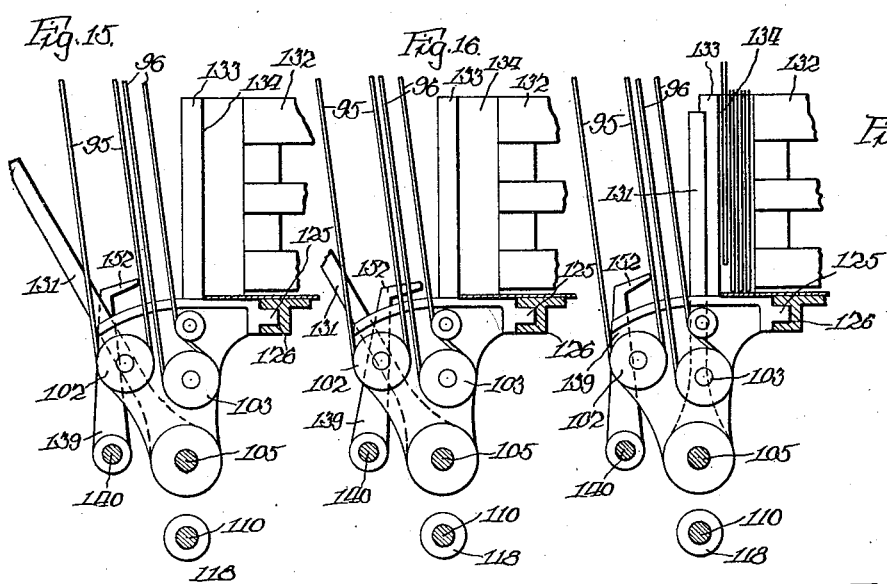

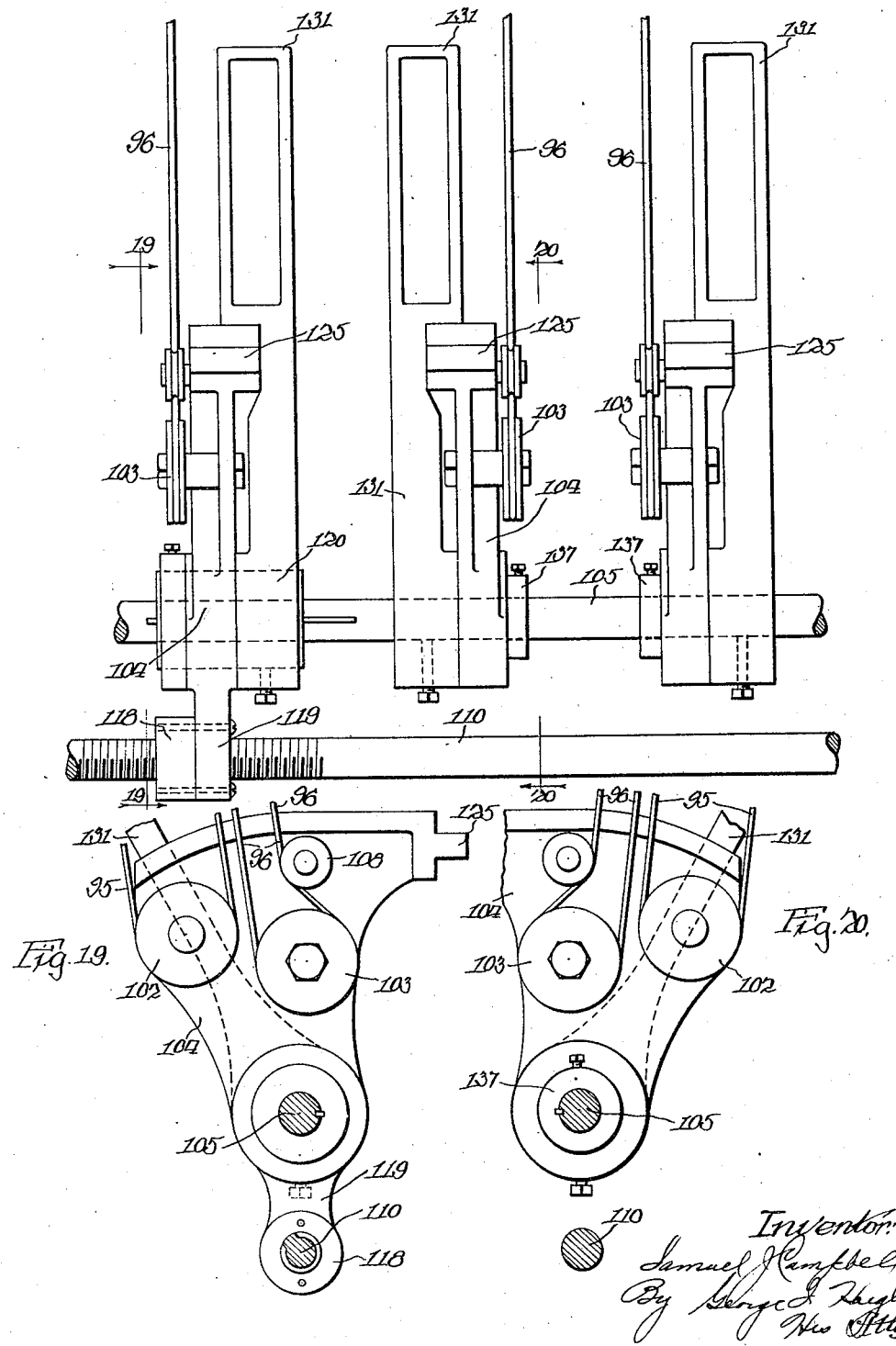

Patented Apr. 17, 1928.

1,666,086

UNITED STATES PATENT OFFICE.

SAMUEL J. CAMPBELL, OF GREEN BAY, WISCONSIN, ASSIGNOR TO HUDSON & SHARP MACHINE COMPANY, OF GREEN BAY, WISCONSIN, A CORPORATION OF WISCONSIN.

ARTICLE FORMING AND FOLDING MACHINE.

Application filed August 13, 1926. Serial No. 128,931.

This invention relates to improvements in article forming and folding machines.

One object of the invention is to provide a highly efficient folding machine especially adapted for folding paper in a plurality of folds.

Another object of the invention is to provide a machine for folding material, wherein the mechanism of the machine is adjustable to adapt it to produce articles of different sizes.

A further object of the invention is to provide a paper folding machine for quarter-folding articles.

Another object of the invention is to provide a machine of great capacity for cutting and folding paper articles wherein a plurality of articles are operated on simultaneously, thereby obtaining exceptionally high speed of operation and production.

Still another object of the invention is to provide a machine for cutting a plurality of paper articles from strips of material and for folding a plurality of paper articles thus cut, wherein a single cutting device operates to simultaneously cut a plurality of such articles and a single folding device is employed to operate on a plurality of said cut articles simultaneously.

A still further object of the invention is to provide a unitary machine for cutting articles from a sheet or strip of material and folding the articles thus cut, wherein the parts of the machine are adjustable to adapt the machine for production of articles of various sizes.

Yet another object of the invention is to provide a unitary machine for cutting articles from a strip of material, folding the articles, and stacking and counting the articles.

Still another object of the invention is to provide a unitary machine for quarter-folding material, wherein adjustable means is provided for producing the folded articles, whereby articles of different sizes may be produced.

A further object of the invention is to provide a machine for cutting articles from a sheet or strip of material and folding the articles into quarters, wherein the cutting mechanism is adjustable to provide articles of different sizes and the folding mechanism is correspondingly adjustable to properly fold the different sizes of articles cut.

A more specific object of the invention is to provide a machine for forming paper napkins and like articles, and quarter-folding the articles, wherein the cutting and folding means are adjustable to produce articles of different sizes.

Another object of the invention is to provide a unitary machine of the character indicated, for cutting rectangular articles from a sheet of paper, quarter-folding the articles, stacking the articles thus folded, and counting the folded articles, wherein all of the parts of the mechanism are adjustable to produce and operate on articles of various sizes.

Other objects and advantages of the invention will more fully and clearly appear from the description and claims hereinafter following.

Figure 2:
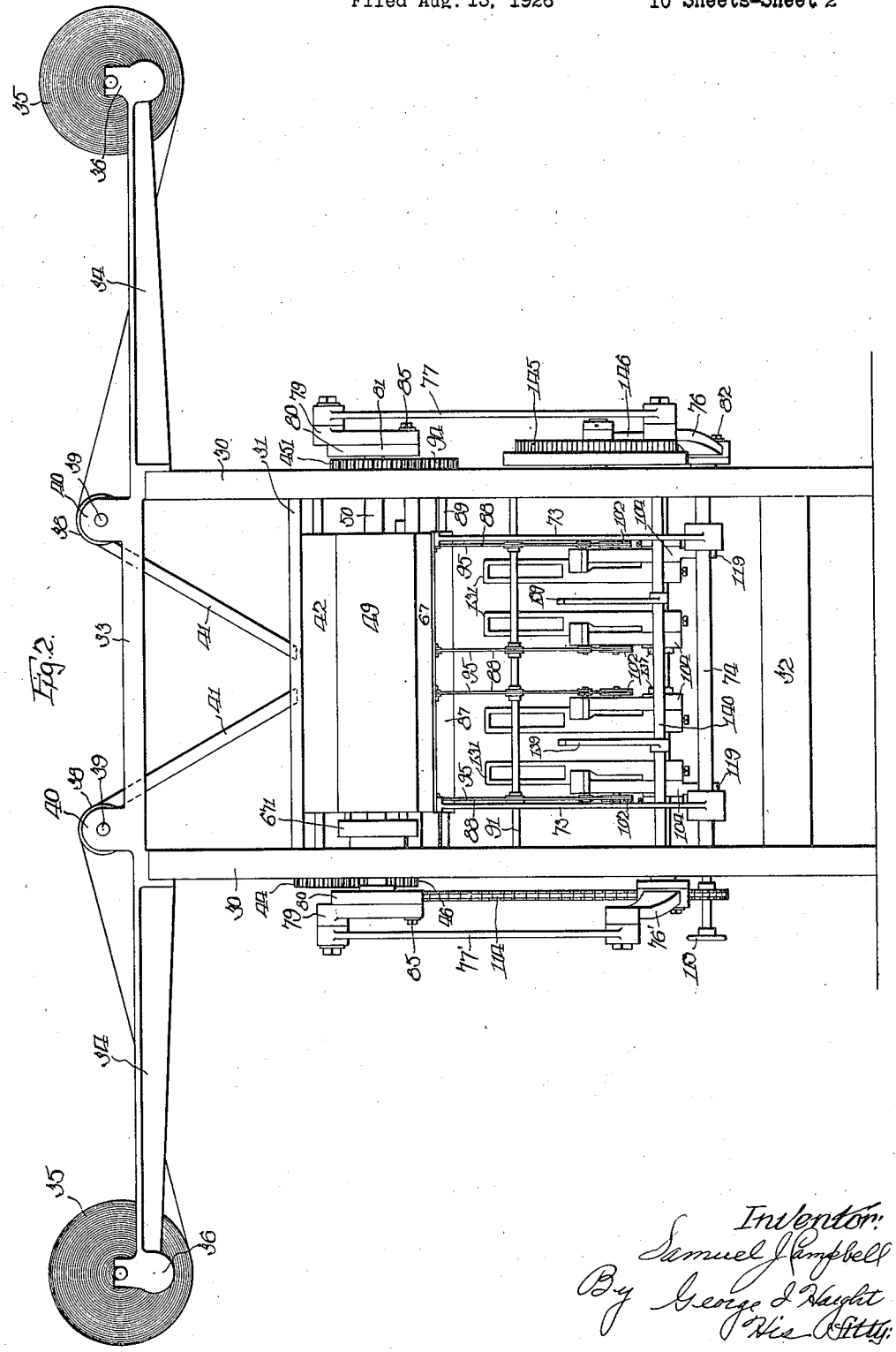
Figure 3:
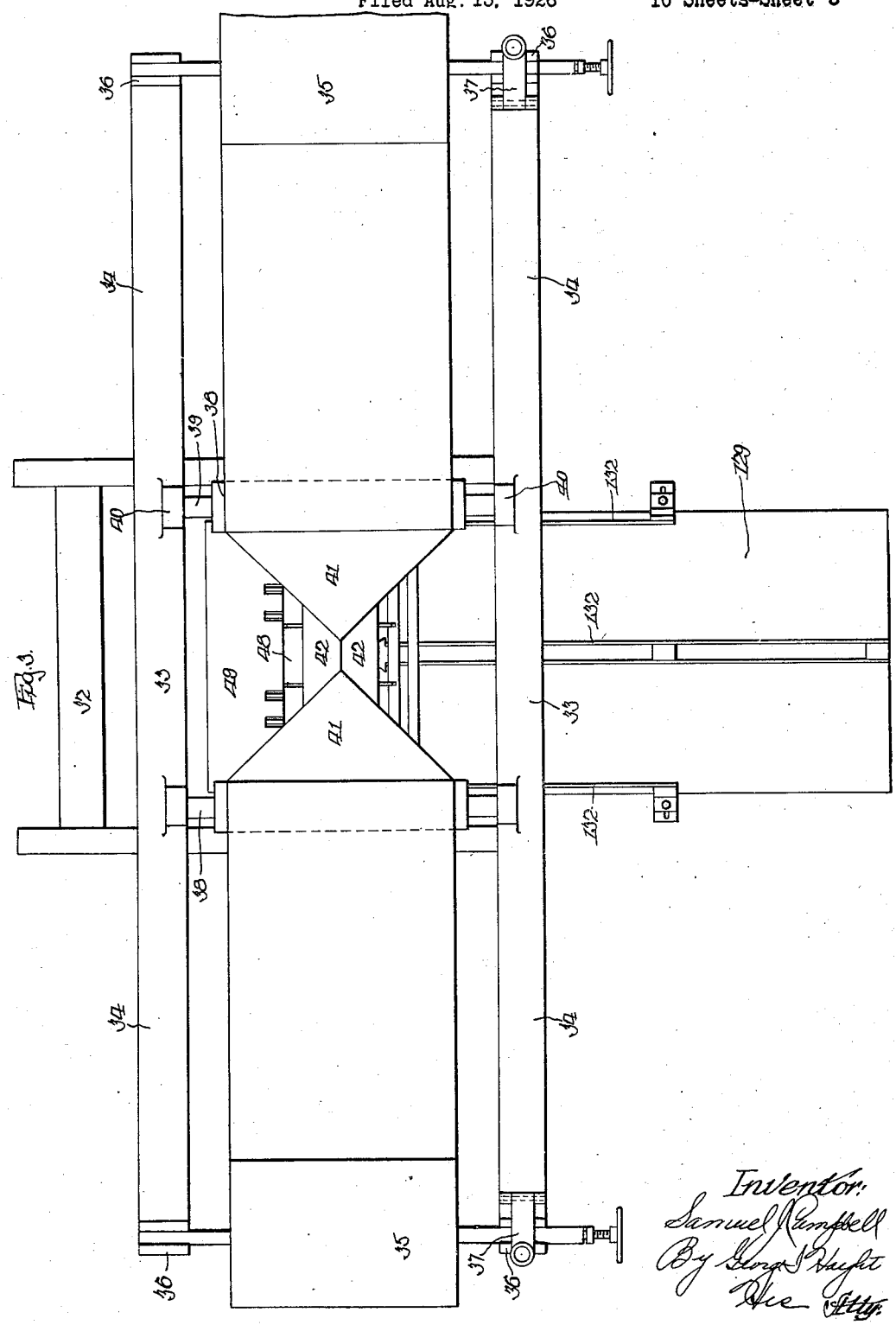
Figure 4:
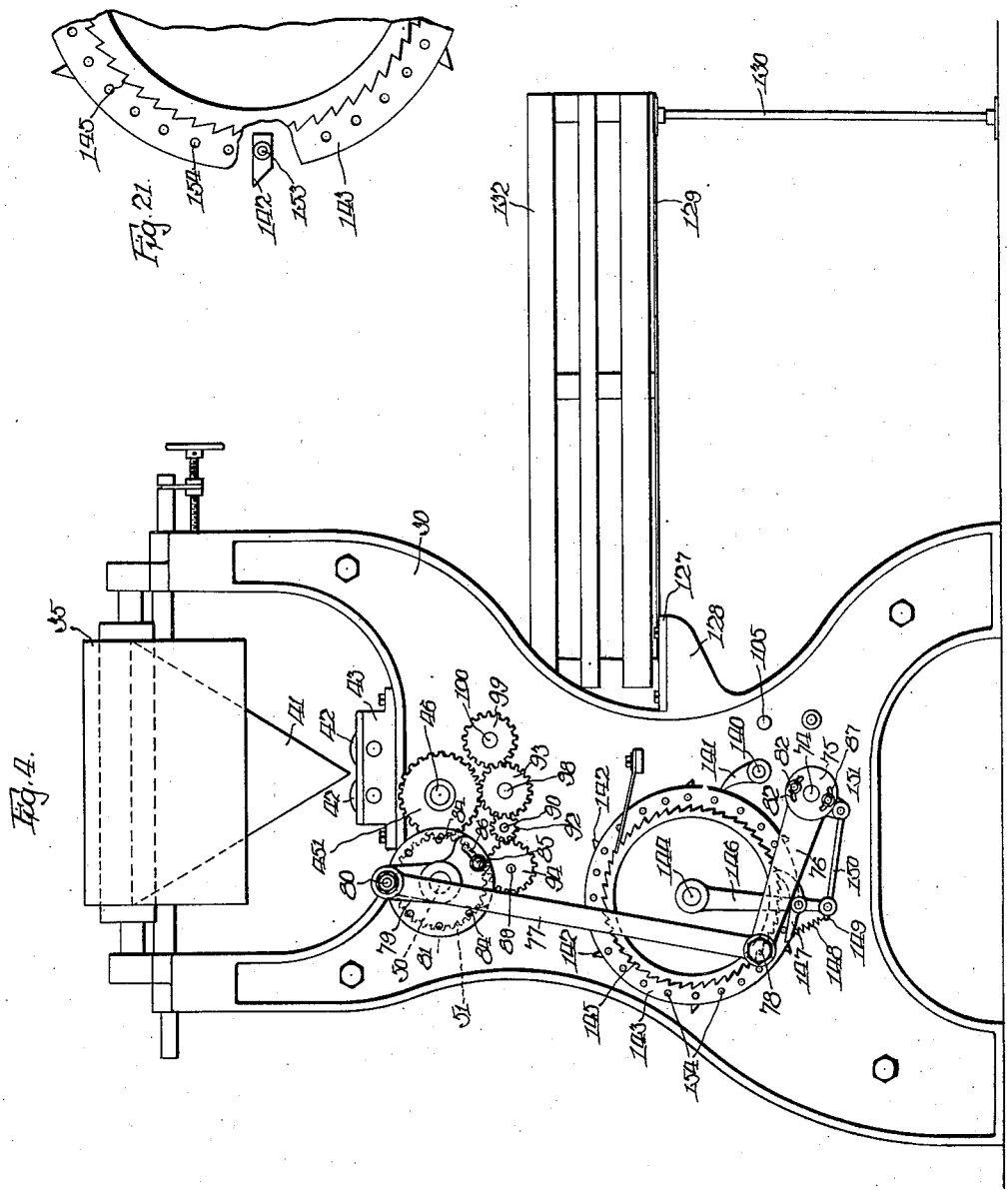
Figure 5:
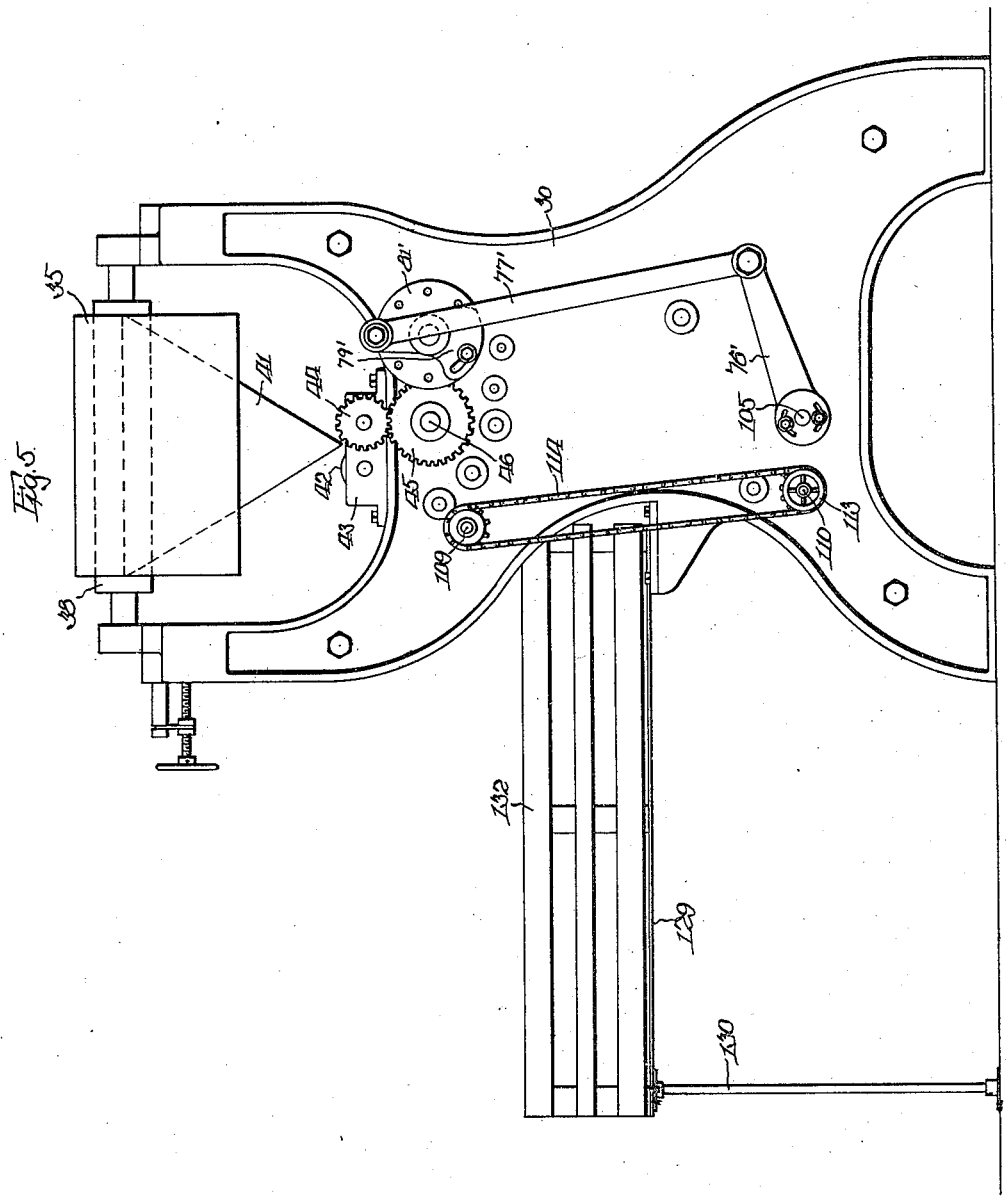
Figure 6:
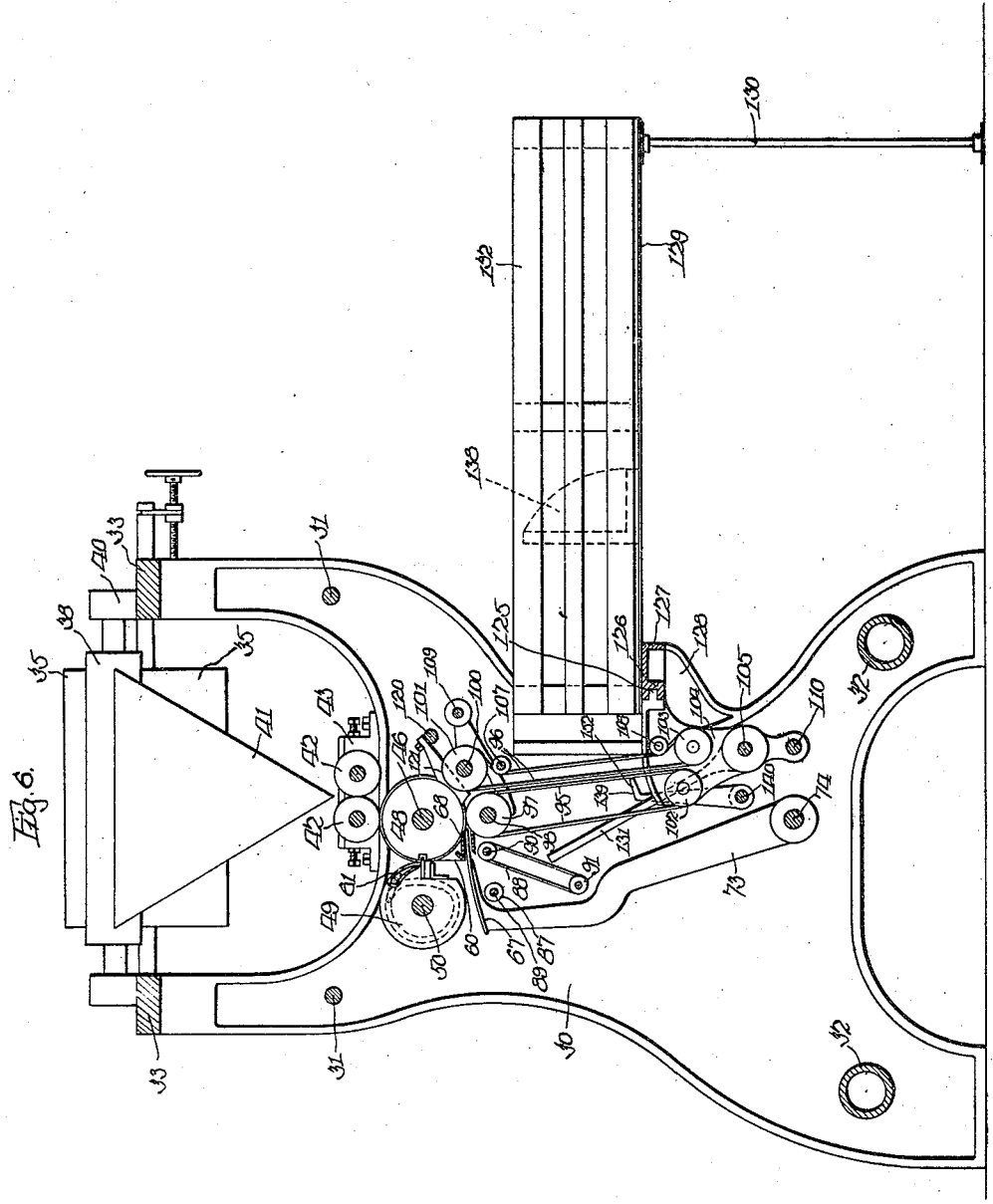
Figure 7:
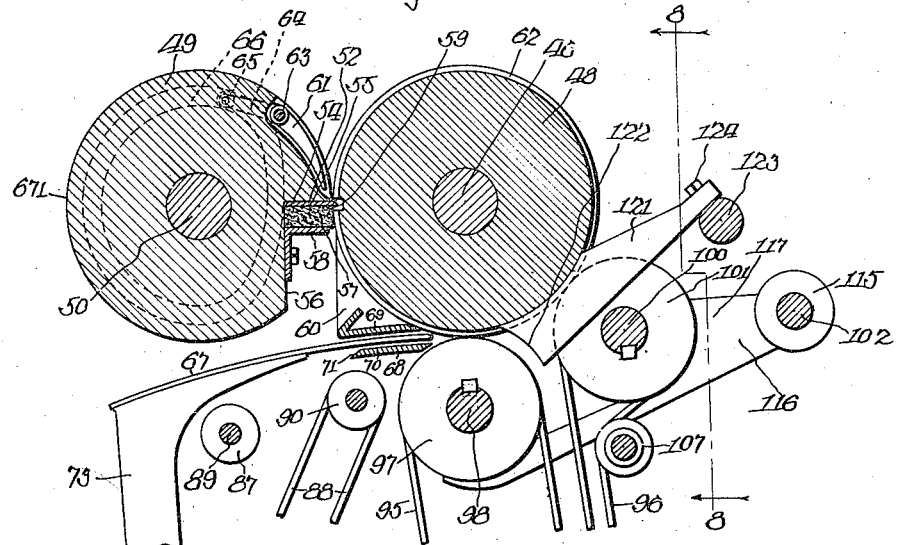
Figure 8:
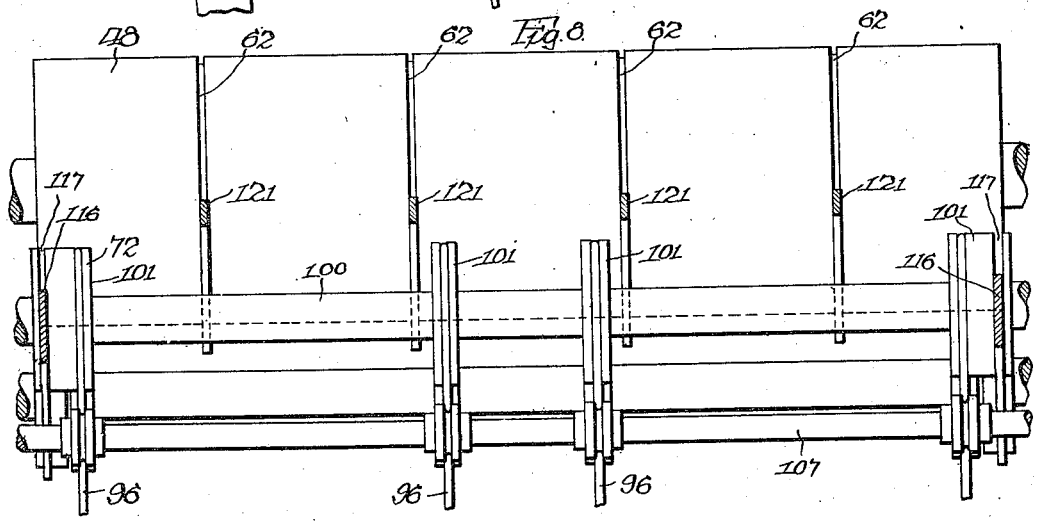
Figure 9:
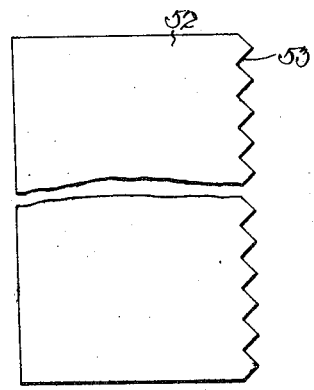

In the drawings, forming a part of this specification, Figure 1 is a front elevational view of a machine embodying my improvements, certain parts being omitted for the sake of clearness. Figure 2 is a rear elevational view of the machine illustrated in Figure 1. Figure 3 is a top plan view thereof. Figures 4 and 5 are side elevational views of the machine illustrated in Figure 1, Figure 4 being a view looking from the left in Figure 1, and Figure 5 being a view looking from the right of said figure. Figure 6 is a vertical, longitudinal, sectional view corresponding substantially to the line 6—6 of Figure 1. Figure 7 is an enlarged vertical sectional view through the cutting rolls and folding and doubling mechanism of the machine. Figure 8 is a vertical sectional view corresponding substantially to the line 8—8 of Figure 7. Figure 9 is a detailed plan view of the cutting blade employed in connection with my mechanism. Figure 10 is a plan view of the roller carrying the cutting blade, together with the cam means for operating the ejector fingers of the roll. Figure 11 is a detailed horizontal sectional view showing the arrangement of table and feed belts. Figures 12, 13 and 14 are vertical, sectional views showing the cutting rollers in end elevation and also the doubling mechanism, together with the adjacent feed means, these figures showing successive positions of the cutting and doubling mechanism while in operation. Figures 15, 16 and 17 are detailed, vertical, sectional views illustrating the stop mechanism of the counting device and the co-operating feed mechanism of the machine. Figure 18 is a detailed front elevational view of the packing mechanism employed in my machine for stacking the articles operated upon. Figure 19 is a detailed, vertical sectional view corresponding substantially to the line 19—19 of Figure 18. Figure 20 is a vertical sectional view corresponding substantially to the line 20—20 of Figure 18. Figure 21 is a detailed sectional view of the cam disk and associated cams of the counting device, partly broken away.

In said drawings, 30—30 designate a pair of side members of the frame of my improved machine. The side members are connected by transverse top and bottom sets of tie members 31 and 32, the tie members 31 and 32 being preferably arranged in pairs adjacent the top and bottom of the frame members 30. At the upper ends, the side frame members 30 are connected by a horizontally disposed frame section 33, the frame section being provided with lateral extensions 34—34 projecting outwardly beyond the opposite sides of the machine. The extensions 34 are preferably formed integral with the horizontal section 33, and the horizontal section 33 is rigidly secured to the upper ends of the side frame members 30 in any suitable manner. As most clearly shown in Figure 3, the lateral extensions 34 comprise two sets of spaced arms, each set having means at the outer end thereof for supporting a roll 35 of strip material which is operated upon by the improved mechanism.

As shown, my improved folding and cutting machine comprises, broadly, mechanism for feeding strip material; means for doubling the strip material longitudinally; means for cutting off different lengths of the folded material; means for doubling the cut-off lengths of folded material; mechanism for feeding the lengths of cut-off material; means for stacking the articles; and mechanism for indicating the count of the number of articles stacked.

In the embodiment of the invention illustrated, the operating mechanism is of the double type, that is, means is provided for operating simultaneously on two strips of material, the strips of material being fed to the various operating means of the machine from the two rolls 35 disposed at opposite sides of the machine.

The rolls 35 as most clearly shown in Figures 1 and 2, are supported in suitable bearings 36—36 at the outer ends of the arms 34. The supporting means for the rolls 35 is of well known form and includes the usual means for adjusting the front set of bearings 36 laterally to properly position the rolls of material. As is common, the rear bearing members 36 are formed integral with the arms 34 of the frame of the machine and clamping means indicated by 37 is employed in conjunction with the front bearing members 36 to retain the rolls of material in position. As shown, each clamping means comprises the usual pivoted arm and co-operating locking bolt and nut.

A pair of transversely disposed feed rollers 38—38 are disposed at the top of the frame of the machine, each of the rolls being provided with a shaft 39 fixed thereto, and journaled in bearings 40—40 on the transverse bracing section 33 of the frame. As most clearly shown in Figures 1, 2 and 3, the feed rolls 38 are disposed closely adjacent the opposite frame members 30. Below the rolls 38 two triangular fixed folding plates 41 are provided. The folding plates 41 are inclined downwardly and converge inwardly of the mechanism, the upper end of each plate being suitably secured to the side members of the horizontal bracing section 33 of the frame. The two folding plates 41 are of well known form and have the folding edges thereof rounded off in the usual manner to prevent tearing of the strip material operated upon. As indicated in Figure 1, the strip material is fed from each roll 35 over the adjacent feed roll 38 to the corresponding folder plate 41. The plates 41 constitute the means for folding or doubling the strip of material longitudinally.

My improved machine is particularly adapted for folding paper napkins, the same being preferably formed of relatively light material, such as tissue paper.

To effect the continuous feeding of the strips of tissue paper over the folding plates 41, I preferably employ a plurality of feed rollers disposed immediately below the lower ends of the plates 41. As most clearly shown in Figure 6, of the drawing, I employ two feed rolls 42—42 which extend entirely across the machine from one side frame member 30 to the other. The feed rolls 42 are placed closely adjacent to each other so that the folded paper strips are tightly pressed together while being drawn through between the rolls. Each of the rollers 42 is provided with a fixed shaft supported at its opposite ends in bearing blocks 43—43 mounted respectively on the side frames 30. As shown in Figure 5, the shaft of the feed roller at the rear side of the machine is provided with a driving gear 44 at one end thereof. The gear 44 meshes with a gear 45 fixed to a shaft 46 journaled in the side frame members of the machine. The shaft 46 carries one of the cutting rollers hereinafter more fully described. The shaft 46 is driven in any suitable manner and may be provided with a driving pulley and suitable clutch means, not shown, at the end carrying the gear 45. At the opposite end, the shaft 46 carries a gear 451. In order to provide for change of relative speed of rotation between the rolls 42 and the driving shaft 46, interchangeable gears are employed which are substituted for the gears 44 and 45. From the feed rolls 42, the material which has been folded lengthwise is fed to the cutting means of my machine. The cutting means comprises a pair of rolls 48 and 49 arranged below the feed rolls 42 and also extending substantially entirely across the machine from one side frame member 30 to the other side frame member. The roll 48 is fixed to the shaft 46 and rotates therewith. The roll 49 is fixed to a shaft 50 suitably journaled in the side frame members 30 and carrying a gear 51 at the outer end thereof, meshing with the gear 451 of the roll 48. The roll 49 carries a transverse cutting blade 52 having a serrated cutting edge 53. The roller 49 is cut out transversely as indicated at 54, thereby providing transverse flat faces 55 and 56 disposed at right angles to each other. The cutter blade 52 is disposed in a plane radial to the roller 49 and bears flatly on the face 55 and is fixed to the roller 49 in any suitable manner, a plurality of screws or bolts being preferably employed. Adjacent the cutter blade, the roller 49 carries a rubber gripping pad 57 clamped in position against the cutter blade 52 by an angle bar 58 having one of the arms thereof bolted to the roller 49 and bearing on the flat face 56 thereof. As shown, the rubber gripping pad 57 is in the form of an elongated strip of rectangular section having the outer longitudinal face thereof projecting slightly beyond the periphery of the roll 49 and also beyond the outer edge of the horizontal section of the angular member 58. As shown most clearly in Figure 7, the rolls 48 and 49 are spaced apart a slight distance so that the strip of paper being fed between the rolls will not actually be gripped by the same, so that there may be slight slippage of the rolls with reference to the strip being fed. The roll 48 is provided with a longitudinally disposed groove 59 adapted to receive the serrated edge 53 of the cutting blade during the cutting operation. It will be evident that the projecting portion of the rubber gripping pad 57 will tightly clamp the strip of paper being fed between the rolls 48 and 49 against the roll 48 so that the strip will be under tension while the cutting blade is operating to cut off a section. The strips of paper which have been folded by the plates 41 are fed forward side by side between the rolls 42, thence loosely between the roll 42 and the roll 48 and between the rolls 48 and 49. It will be evident that during the rotation of the cutting rolls 48 and 49, while the strip is being continuously fed therebetween, the cutter blade 52 will become operative at predetermined intervals to cut sections from the two folded strips simultaneously. In order to prevent the cut sections of strip material from adhering to the cutting rolls 48 and 49 as they are fed forward in the machine, two pairs of stripping blades 60 cooperate with the feed roll 48, and the feed roll 49 is provided with a plurality of ejecting fingers 61. The stripping blades 60 are vertically disposed and extend into peripheral guide grooves 62 on the roller 48. As shown in Figure 8, the roll 48 is provided with four grooves 62 which co-operate with the two sets of stripper blades 60, each set serving to strip one of the simultaneously cut sections of material from the roll 48.

As most clearly shown in Figure 10, the ejecting fingers 61 which co-operate with the roll 49 are preferably eight in number, comprising two sets of four fingers, each set co-operating with one of the simultaneously cut sections. As shown in Figures 7 and 10, the fingers 61 are accommodated in suitable openings provided in the roll 49 and are fixed at the ends remote from the cutting blade 52 to a shaft 63 journaled in the roll 49. The shaft 63 projects beyond the outer end of the roll at the left hand end thereof as shown in Figure 10 and has an operating lever arm 64 fixed thereto. The outer end of the lever arm 64 carries a stub shaft having a cam roller 65 journaled thereon. The cam roller 65 travels in a cam groove 66 of a fixed cam member 671 suitably secured to one of the side frames 30 of the machine. As most clearly shown in Figure 7, the cam groove 66 is so designed that the ejecting fingers 61 will be moved outwardly to strip the material from the roll 49 after the cutting operation has been performed so that the next succeeding section cut from the strip will be positioned properly for the folding or doubling operation. As hereinbefore pointed out, the driving gears 44 and 45 are interchangeable so as to change the speed of rotation of the feed rolls 42 with respect to the cutting rolls 48 and 49, thereby providing for adjustment of the mechanism to vary the rate of feeding of material to the cutting mechanism so that different sizes of articles may be cut from the folded strip of material. It will be obvious that when a relatively larger gear is substituted for the gear 44 and a smaller gear for the gear 45 the feed rolls 42 will be rotated at a relatively slower speed, thereby feeding shorter lengths of the strip material to the cutting rolls and consequently the cutting rolls will sever shorter lengths to form articles of a smaller size. In this connection, it is pointed out that when the machine is adjusted for cutting smaller sized articles correspondingly narrower rolls of strip material are substituted for the rolls 35 so that substantially square articles, such as paper napkins, may be produced.

The doubling mechanism for folding the longitudinally folded cut-off sections to produce quarter-folded articles includes an oscillating folder blade 67 which co-operates with a folding guide 68. The folding guide 68 comprises upper and lower plate-like members 69 and 70 spaced apart a proper distance to admit the folding blade therebetween. The folding guide 68 extends entirely across the machine and is secured to the side frame members 30 thereof in any suitable manner. The upper plate 69 has the four stripping blades 60 formed integral therewith. As most clearly shown in Figure 7, the free edge of the upper plate 69 is turned inwardly at an angle, and the free edge of the lower plate 70 terminates short of the upper plate 69 and has the free edge thereof beveled outwardly as indicated at 71 to thereby facilitate the entrance of the material being folded into the guide 68. The rear end of the plate 70 terminates adjacent a plurality of feed rollers 97 hereinafter more fully described. The upper guide plate 69 terminates adjacent the lower side of the cutting roller 48. The folding blade 67 is fixed to a pair of arms 73 fixed to a shaft 74 suitably journaled in the side frame members 30 of the machine. One end of the shaft 74 projects beyond the corresponding side frame member as most clearly shown in Figure 4 and has a disk 75 fixed thereto. The disk 75 is connected to an arm 76, which in turn is connected to a pitman 77 by means of a pivot bolt 78, the upper end of the pitman 77 being connected to a crank member 79 by means of a crank pin 80. The crank member 79 is adjustably connected to a disk 81 which is fixed to the shaft 50 of the cutting roller 49. Inasmuch as the shaft 50 is rotated directly from the driven shaft 46 by the intermeshing gears 451 and 51, the disk 81 will be correspondingly rotated, thereby reciprocating the pitman 77 and oscillating the arms 73 through the connecting link 76 and shaft 74 to which the arms 73 are fixed. Adjustment of the arm 76 with reference to the disk 75 is provided by means of a pair of bolts 82 adjustable in slots 83 in the disk 75. Adjustment between the crank member 79 and the disk 81 is also provided, the disk 81 being provided with a number of spaced openings 84 adapted to receive a bolt 85 extending through the crank member 79. A slot 86 is preferably provided in the crank member 79 to accommodate the bolt 85 so as to provide still finer adjustment. It will be evident that by means of the adjustment provided between the crank member 79 and the disk 81, and between the disk 75 and the arm 76, the oscillation of the arm 73 and consequently the folding blade 67 may be timed to correspond with the adjustment of the feeding and cutting mechanism hereinbefore described to produce different sizes of articles. In the operation of the oscillating folding member, the free edge of the folding blade 67 will engage precisely midway between the top and bottom ends of the cut-off sections of longitudinally folded material, thereby forcing the same between the top and bottom plates 69 and 70 of the guide member 68 and doubling the article. As shown in Figure 7, the blade 67 is preferably curved on the arc of a circle having its center coincident with the center of the shaft 74, so that the blade will work freely within the guide 68 without binding.

In order to prevent the cut-off sections from being displaced when fed to the folding blade 67, a knurled feed roller 87 and co-operating feed belts 88 are provided. The feed roller 87 extends entirely across the machine and is mounted on a shaft 89 journaled in the side frame members 30. The feed belts 88 are preferably four in number, two being provided for each of the sections of material cut from the two strips. The feed belts 88 are trained over pulleys 90 and 91 carried on shafts extending across the machine. The pulleys 90 at the upper ends of the feed belts 88 are fixed to the shaft on which they are mounted and this shaft carries a gear 92 at one end thereof meshing with a gear 93 which in turn meshes with the gear 451 on the drive shaft of the machine. The shaft 89 on which the knurled feeding roller 87 is mounted, carries a gear 94 at one end thereof, meshing with the gear 51. It will be evident that the knurled feed roller 87 and the belts 88 are thus driven continuously during the operation of the machine. As shown in Figures 6 and 7, the knurled feed roller is disposed rearwardly of the vertical plane of the articles being folded and the rollers 90 of the feed belts 88 are disposed forwardly of the rear end of the folding guide 68, thereby disposing the active run of the belts 88 opposite the knurled roller 87 and just below the entrance to the folding guide 68.

After the articles have been quarter-folded by means of the blade 67, they are carried to the packer mechanism for stacking the finished articles by means of a plurality of feed belts 95 and 96. The feed belts 95 and 96 are arranged in two groups, each group comprising two sets of belts at opposite sides of the machine, the respective sets of the belts of the two groups co-operating with the articles being fed at opposite sides of the machine. The inner runs of the belts 95 and 96 are disposed adjacent each other and form in effect a guideway therebetween to accommodate the articles being fed. The upper ends of the belts 95 are trained over rollers 97 mounted on a transverse shaft 98 journaled in the side members 30 of the machine. At one end, the shaft 98 carries the drive gear 93 which meshes with the gear 451 as hereinbefore described. The gear 93 drives a gear 99 which is fixed to the corresponding outer end of a shaft 100 extending transversely of the machine and journaled in the side frame members 30. The shaft 100 carries a plurality of rollers 101 over which the upper ends of the belts 96 are trained. As most clearly shown in Figures 7 and 8, the rollers 97 and 101 are grooved to properly guide the feed belts. The lower ends of the feed belts 95 and 96 are trained over grooved pulleys 102 and 103 respectively, mounted on castings 104 in the form of bracket members supported on a shaft 105 extending transversely of the machine adjacent the bottom thereof and having its opposite ends journaled in the side frame members 30. Upper and lower sets of tensioning rollers 107 and 108 are preferably employed in connection with the belts 96, the upper rollers being mounted on a transverse shaft fixed to the side frame members of the machine and the lower rollers 108 being mounted on suitable stub shafts on the brackets 104. As shown in Figures 1, 7 and 8, the outermost rollers 101 at the opposite sides of the machine, as well as the corresponding rollers 97, are adjustable laterally so as to provide a corresponding adjustment of the outer runs of the belts 95 and 96 to accommodate the mechanism to feed different sized articles. The lower guide pulleys 102 and 103 which co-operate with the outer belts 95 and 96 are adjustable laterally to correspond with the upper rolls referred to. The adjusting means for the belts comprises an upper shaft 109 and a lower shaft 110 journaled in the side frames 30 of the machine. Each of these shafts is provided with right and left threads 111 and 112 adjacent the opposite ends thereof. The lower shaft 110 carries a fixed operating wheel 113 at the outer end thereof and the two shafts are connected by a sprocket chain drive 114. It will thus be seen that when the operating wheel 113 is rotated, the shafts 109 and 110 will be rotated in unison in the same direction. A pair of nuts 115 co-operate respectively with the right and left threads of the shaft 109. Each of these nuts has a blade member 116 formed integral therewith, the blade 116 of each nut engaging within grooves formed in the rolls 97 and 101 at the corresponding side of the mechanism. The grooves of the rollers 101 are designated by 117 in Figure 8. As most clearly shown in Figure 7, the blade 116 of each nut 115 is provided with an enlarged vertical section 117 having a curved end face which corresponds with the curvature of the roll 101 and snugly fits the curved bottom of the groove 117 thereof, thereby preventing displacement of the blade 116. It will be seen that when the shaft 109 is rotated the nuts 115 will be moved either outwardly or inwardly in accordance with the direction of rotation of the shaft, thereby effecting a corresponding movement of the outer rolls 97 and 101 to adjust the outer feed belts 95 and 96 toward and away from the inner belts of the feed mechanism. The outer pulleys 97 and 101 may be mounted on the shafts 98 and 100 in any suitable manner so as to provide for rotation of the rolls with the shafts and also adjustment longitudinally thereof. In practice, the rolls are preferably splined to the shafts 98 and 100. The inner pair of rolls of each group are relatively fixed and do not require adjustment to properly fit the machine for operation on different sizes of articles. A pair of nuts 118 also co-operate with the shaft 110, the nuts being disposed at opposite ends of the shaft, and co-operating respectively with the right and left threads thereof. Each of the nuts 118 is suitably secured to an extension 119 provided on the corresponding side bracket member 104. It will be evident that upon rotation of the shaft, the two nuts 118 and the brackets attached thereto will be moved relatively toward or away from each other depending upon the direction of rotation of the shaft 110, thereby properly adjusting the brackets 104 and the guide pulleys 102 and 103 of the outer brackets to correspond with the adjustment of the upper ends of the belts.

As most clearly shown in Figures 18 and 19, the two outer brackets 104 are supported on sleeves 120 which are freely rotatable in openings at the lower ends of the brackets 104. The sleeves 120 are directly supported on the shaft 105 being splined thereto as clearly shown in Figure 18. The innermost brackets 104 are directly supported on the shaft 105 and are held against lateral movement thereon by suitable means hereinafter more fully described.

To properly guide the quarter-folded sheets of material to the guide belts 95 and 96, a plurality of stripper blades 121 are provided which co-operate with the cutter roll 48. As most clearly shown in Figure 8, the blades 121 are four in number, and engage within the grooves 62 of the roll 48. Each of the blades 121 has the upper edge thereof corresponding in contour to the contour of the co-operating groove 62 so as to properly fit the roller. The outer edge of each of the blades 121 is concave as indicated at 122 to correspond with the curvature of the feed rollers 97. The blades may be supported in any suitable manner, in this instance, being shown as supported on a transverse shaft 123 fixed to the side frame members and held to the shaft by means of cap screws 124. It will be evident that the curved outer edges 122 of the blades 121 will serve to properly guide the folded articles between the inner runs of the feed belts 95 and 96 after the same have been quarter-folded by the co-operating blade 67 and guide 68. As most clearly shown in Figures 6 and 15 to 19, inclusive, the four brackets 104 are of such a size as to extend forwardly and rearwardly beyond the inner rolls of the feed belts 95 and 96 and serve as stop means for limiting the movement of the articles between the belts. It will be evident that the outermost brackets 104 are held against rotation on the shaft 105 by the extensions 119 thereof which are supported from the shaft 110. Each of the brackets 104 is also provided with a guide flange or rib 125 working in a transverse groove 126 on a transverse beam 127 fixed to brackets 128 formed integral with the side frame members 30 of the machine. It will be evident that the ribs 125 serve to properly guide the outer brackets during their lateral adjustment, and the ribs of the innermost brackets 104 engage within the grooves 126 to prevent rotation of these brackets with the shaft 105. The transverse beam 127 also serves as a support for a table 129 on which the articles are stacked. The outer end of the table as shown is preferably supported by a pedestal 130.

The stacking mechanism of my improved machine includes a plurality of packer blades 131 which move the articles along the table 129 away from the feed belts 95 and 96 and stack the same on the table. As shown in Figures 4, 5, 6 and 11, the feed table 129 carries a plurality of guides 132—132 dividing the table into two magazines or compartments. As most clearly shown in Figure 11, the central guide member 132 has two spaced walls and at the inner end thereof a block 133 is provided having lateral extensions projecting beyond the side walls of the inner guide, thereby presenting interior shoulders 134—134. The side guide members 132 also have blocks 135 adjacent the inner ends thereof, the blocks 135 being provided with laterally inwardly projecting enlargements presenting transverse shoulders 136 in alignment with the shoulders 134. The blocks are outwardly beveled, thereby providing flaring entrances to the compartments of the magazine. As will be evident that when an article corresponding in width to the corresponding magazine compartment is forced into the compartment, the same will be slightly bowed and snap past the shoulders 134 and 136 and be held against outward movement with reference to the shoulders when stacked in the compartment. The innermost guide 132 is fixed to the table, but the two outer guides 132 are adjustable laterally toward the center guide to accommodate the two compartments of the magazine to receive articles of different sizes to correspond with the adjustment of the machine. Any suitable means may be provided to produce this adjustment, the supporting brackets of the side guides 132 being shown as slotted and receiving bolts secured to the table 129.

The packer blades 131 are four in number, being arranged in pairs between the feed belts of each set. The packer blades 131 are so spaced with reference to the feed belts that they will swing freely therebetween. The outermost packer blades 131 are fixed to the sleeves 120 which are splined to the shaft 105 and the innermost packer blades 131 are fixed directly to the shaft 105 as most clearly indicated in Figure 18. Any suitable means may be provided for fixing these blades to the shaft 105, set screws being shown. The inner brackets 104 are disposed closely adjacent the inner packer blades and are held against lateral movement with reference to the same by means of collars 137 fixed to the shaft 105 by set screws.

The shaft 105 extends through the side members 30 and is journaled therein so as to permit oscillating movement thereof. One end of the shaft 105 extends beyond the right hand side frame 30 as shown in Figure 1 and is oscillated through means connected to the shaft 50 of the cutting roller 49. The means for oscillating the shaft 105 is substantially the same as that provided for oscillating the shaft 74 hereinbefore described, and as shown in Figure 5, comprises a link 76', a connecting pitman 77', a crank member 79', and a disk 81', in all respects similar to the parts 76, 77, 79 and 81 hereinbefore described. A similar adjustment means to that heretofore described is provided between the arm 76' and the shaft 105 and also between the crank 79' and the disk 81'. It will be evident that the oscillation of the shaft 105 and the packer blades may therefore be properly timed in accordance with the adjustment of the remaining parts of the mechanism. As the packer blades 131 are oscillated, the same will swing forwardly and push the articles from between the feed belts 95 and 96 and force them along the table 129 into the compartments of the magazine thereof, thereby stacking the finished articles between the guides 132 of the table. Any suitable means may be provided for holding the stacked articles in the magazine, a weighted member 138 indicated in Figure 6 being provided in each compartment of the magazine. The weighted member 138 is in the form of a block having a flat end face co-operating with the stacked articles and being slidable on the upper face of the table. Adjustment for the outer blade 131 of each pair is provided simultaneously with the adjustment of the feed belts by means of the movable brackets 104 with which these packer blades are provided. As hereinbefore described, the outer brackets 104 are adjustable by the right and left threaded shaft 110.

From the foregoing description, it will be evident that upon rotation of the wheel 113, adjustment will be provided simultaneously for the feed belts 95 and 96 and the packer blades 131 through the shafts 109 and 110 which are geared together by the sprocket chain 114.

In order to indicate a count of the number of articles stacked, I provide a pair of pivoted stop fingers 139 which are adapted to be swung into the path of the articles being fed between the belts 95 and 96. The stop fingers 139 are mounted on a transverse shaft 140 having its opposite ends journaled in the side frame members 30 of the machine. The shaft 140 projects beyond the left hand side member 30 as shown in Figure 1, and carries a lever arm 141, more clearly shown in Figure 4, on the outer end thereof. The lever arm 141 is oscillated at predetermined intervals by a plurality of cam blocks 142 mounted on a disk 143 carried on a stub shaft 144 on the corresponding frame member 30. The stub shaft 144 also carries a ratchet wheel 145 which is fixed thereto. The ratchet wheel is operated by a pawl mechanism including a pivoted arm 146 freely swingable on the shaft 144 and carrying a pivoted pawl 147 adjacent the free end thereof which co-operates with the teeth of the ratchet wheel 145. The pawl 147 is the spring held in engagement with the ratchet teeth in the usual manner, a spring 148 being attached to the tail of the pawl and to a projection 149 on the outer end of the arm 146. The arm 146 is oscillated by means of a connecting rod 150 pivotally secured to the outer end of the arm 146 and a lug 151 formed integral with the arm 76 which oscillates the shaft 74. As will be evident, upon oscillation of the arm 76 through the pitman 77, the connecting link 150 will be reciprocated, thereby oscillating the arm 146, and advancing the ratchet wheel. As the ratchet wheel 145 is rotated, the cam disk 143 which is also secured to the shaft 144 will be intermittently rotated in unison therewith, thereby bringing the cam blocks 142 successively into engagement with the lever arm 141. The lever arm 141 will thus be thrown to the right, as shown in Figure 4, rotating the shaft 140 in a similar direction and throwing the fingers 139 thereon into the path of the articles being fed between the belts 95 and 96. As most clearly shown in Figure 6, each of the fingers 139 is provided with a toe 152 which is disposed substantially horizontally and acts as a stop for the article. The cam blocks 142 are preferably spaced apart equal distances on the disk 143, thereby effecting oscillation of the fingers 139 at predetermined intervals. It will be evident that when the fingers 139 are thus projected into the path of the articles at predetermined intervals they arrest an article after a predetermined number have been fed. As shown in Figure 6, the toes of the fingers 139 are spaced an appreciable distance above the upper guide surfaces of the brackets 104, thereby arresting movement of the articles in a position above that assumed during the normal feed of the articles. With the articles stopped in this position, the packer blades 131 will carry the same into the magazine in such a manner that they will project above the remaining articles of the stack, thereby indicating the count. As most clearly shown in Figure 21, the cam blocks 142 are secured to the disk 143 by clamping bolts 153. In order to provide for adjustment of the counting mechanism to indicate different counts, the disk 143 is provided with a plurality of bolt receiving openings 154, whereby the cam blocks 142 may be secured to the disk at different distances apart. In the present instance, six cam blocks 142 are shown as secured to the disk 143. If it is desired that the count of the number of articles be increased, the proper number of cam members may be removed so that the remaining cam members will be spaced the proper distance apart to indicate the count desired. As shown in Fig 2, the stop fingers 139 are disposed midway between the packer blades 131 of each pair.

The operation of my improved machine is as follows: Two strips of material are fed from the rolls 37 at opposite sides of the machine over the folding plates 41, being drawn over the latter by the continuously rotating feed rollers 42. The two strips of material are thus longitudinally folded along a center line and are fed side by side between the rolls 42. The longitudinally folded strips are fed from the rolls 42 between the roll 42 at the rear of the machine and the front cutting roller 48. Thence, the two longitudinally folded strips pass side by side between the two cutting rollers 48 and 49, as clearly shown in Figures 12, 13 and 14, and in a substantially vertical position in front of the folding blade 67. During the continuous rotation of the two rolls 48 and 49, the cutting blade 52 will be brought into operation intermittently to sever different lengths of the longitudinally folded strips, as shown in Figure 13. During the cutting operation of the blade, the strips will be tightly clamped between the rollers 48 and 49 by the gripping pad 57, thus holding the strips under tension while being cut. As the doubled sections of the strips pass in front of the folding blade 67, the latter will, upon its inward reciprocation as shown in Figure 13, engage the strips and double the same at right angles to the direction of the first fold, at the same time forcing the same into the guide 68. The reciprocation of the folding blade 67 is so timed with respect to the rotation of the cutting rollers that the blade will fold the cut off sections precisely midway between the top and bottom ends thereof and forces the cut-off articles into the guideway 68. The two articles which have been quarter-folded will thus be fed side by side through the guideway 68 between the cutting roller 48 and the feed rollers 97. As the two articles are fed between the last named rollers, the guide blades 121 will strip the articles from the roller 48 and guide them between the inner runs of the feed belts 95 and 96 downwardly until they engage the upper surfaces of the brackets 104. The packer blades 131 are oscillated in timed relation to the folding blade 67 so that each time two articles are stopped between the feed belts 95 and 96 by engagement with the brackets 104, the packer blades 131 will be swung forwardly and move the two folded articles along the upper surfaces of the brackets 104 and sweep the same into the two compartments of the receptacle supported by the table 129. The finished articles are thus stacked in succession on the table between the guide members 132 thereof. As the articles are fed along the table, the weighted blocks 138 will be pushed forwardly along the table and hold the stacked articles in vertical position. When a predetermined number of articles have been stacked, the two next succeeding articles at opposite sides of the machine will be stopped above the upper surfaces of the brackets 104 by the oscillating fingers 139. The fingers 139 are projected into the path of the articles passing between the feed belts 95 and 96, as clearly shown in Figures 15, 16 and 17, at certain predetermined intervals by the operation of the cam blocks 142 on the cam disk 143 which is intermittently rotated in timed relation with the reciprocation of the packer blades as hereinbefore described. The two articles which are arrested in raised position by the fingers 139 will protrude from the upper side of the stack, thereby indicating the number of articles stacked in each compartment up to that time. By counting the number of projecting articles in a stack, the total number may be easily and quickly calculated.

In order to adapt the machine to produce folded articles of different sizes, the various parts of the machine, including the cutting mechanism, the doubling mechanism, the feed belts, the packer blades and the compartments of the receptacle, are adjustable.

The adjustment of the machine is as follows, assuming that it is desired to produce a folded napkin of smaller size than produced by the machine when adjusted as shown in the drawings, two rolls of material of the proper width are substituted for the rolls 35. The material is fed through the machine in the same manner as hereinbefore described. In order to cut off the proper lengths of the folded strips of material so that the finished article will be of rectangular shape, the feed of the rollers 42 is slowed up the proper amount with respect to the speed of rotation of the cutting rolls 48 and 49 by substituting other gears for the gears 44 and 45. The strips will thus be fed at a slower rate of speed and the cutting rollers 48 and 49 will slip relatively to the strips, whereby shorter lengths of material will be severed from the two strips. Inasmuch as the feed of the strip material has been thus slowed up, the reciprocating folding blade 67 must also be retarded so as to engage the shorter cut-off sections midway between the top and bottom ends. This adjustment is effected by changing the position of the crank member 79 with reference to the disk 81 shown in Figure 4 of the drawings. As the feeding of the folded articles will also be at a different interval due to the smaller size of the same, the packer blades must also be properly adjusted and timed with respect to the other parts of the mechanism. This is effected by adjustment of the crank 79' with respect to the disk 81', whereby the time of oscillation of the shaft 105 is altered. In order to properly accommodate the smaller sized folded articles in the feed mechanism of the machine and in the compartments of the storage chamber on the table 129, the following adjustments are necessary: The two outer guide members 132 are moved laterally inwardly toward the side member so as to alter the width of the two compartments to correspond with the width of the folded articles. The two adjusting shafts 109 and 110 are rotated by means of the hand wheel 113, thereby effecting lateral inward adjustment of the outer brackets 104 and the outermost upper feed rolls 97 and 101 respectively toward the two fixed inner brackets 104 and the two fixed inner feed rolls 97 and 101. Due to the lateral adjustment of the brackets 104, the two outer packer blades 131 of each set will also be adjusted toward the laterally fixed inner blades. Inasmuch as the guide pulleys on the outer brackets 104 are adjustable in unison with the same, the belts 95 and 96 will be spaced apart a uniform distance at their upper and lower ends at all points of adjustment of these elements.

From the foregoing description, it will be evident that the machine may be adjusted so as to operate on articles of any desired sizes within given predetermined limits.

Although I have shown my improvements in connection with a machine of the duplicate type, it will be evident that my invention is not restricted to this arrangement, but that the novel features of the same are equally adapted to machines of the single unit type, that is, wherein a single strip is operated upon to produce quarter-folded articles.

Inasmuch as all the parts of the mechanism of my improved machine, with the exception of the reciprocating folder and packer blades, are driven continuously, a very high speed of operation of the mechanism is obtained. It will aso be evident that by combining two units in a single machine and employing a single cutting and a single folding device which co-operate with both units, the output is practically doubled, thus maintaining a very high degree of efficiency in operation.

While I have herein shown and described what I now consider the preferred manner of carrying out my invention, the same is merely illustrative, and I contemplate all changes and modifications that come within the scope of the claims appended hereto.

I claim:

1. In a cutting and folding machine, the combination with means for feeding a plurality of strips of material and doubling each strip and feeding said doubled strips side by side; mechanism operating on all of siad folded strips simultaneously for cutting a plurality of articles therefrom; a folding mechanism, comprising a single folding blade operating on a plurality of said folded articles simultaneously to double said folded articles, thereby producing quarter-folded articles.

2. In a cutting and folding machine, the combination with means for feeding a strip of material at a predetermined rate of speed; of means for cutting articles from said strip of material at timed intervals; means for folding said cut articles; and means for adjusting the rate of speed of feeding of said strips with respect to the timed intervals of operation of the cutting means to cut articles of different lengths.

3. In a cutting and folding machine, the combination with means for feeding a strip of material and folding the same lengthwise; of means for cutting definite lengths from said folded strip; means for again folding said lengths of material; and driving means operatively connecting said feeding and cutting means, said driving means being adjustable to effect cutting of articles of different sizes and said second named folding means being correspondingly adjustable to double said articles.

4. In a cutting and folding machine, the combination with means for feeding a strip of material; of continuously operative folding means for doubling said strip while being fed; of means for cutting said folding strip into definite lengths; means for doubling said folded lengths to produce quarter-folded articles, said feeding means being adjustable to vary the length of the strip material fed for each cutting operation to produce articles of different sizes, said doubling means being adjustable to properly fold said articles of different sizes; and feed means for conveying said articles to a stacking mechanism; packing means for stacking said articles, said packing means being adjustable to stack articles of different sizes.

5. In a cutting and folding machine, the combination with means for feeding a strip of material and folding the same lengthwise; of cutting means for severing definite lengths from said folded strip, said cutting and feeding means being relatively adjustable to produce articles of different sizes; means for doubling said folded articles, said means including a folding element adapted to fold said articles midway between the ends thereof, said element being adjustable to operate on articles of different sizes to correspond with the adjustment of the cutting and feeding means.

6. In a cutting and folding machine, the combination with means for feeding a strip of material and folding the same lengthwise; of continuously operating rotary cutting elements for cutting definite lengths from said folded strip; connecting driving means between the cutting means and feeding means for feeding said strip and operating the rotary cutting elements, said connecting driving means being capable of adjustment to vary the speed of operation of the feeding means with respect to the speed of operation of the cutting means to thereby effect the cutting of articles of different lengths.

7. In a cutting and folding machine, the combination with means for feeding a strip of material and folding the same lengthwise; of rotary means having cooperating cutting elements thereon operative to cut definite lengths from said folded strip; means for doubling the articles cut from said folded strip; interconnected driving means for operating said feeding, rotary and doubling means, said interconnected driving means being adjustable to adapt said rotary means and doubling means for operation on articles of different sizes.

8. In a cutting and folding machine, the combination with means for feeding a strip of material and folding the same lengthwise; of means for cutting definite lengths from said folded strip; means for doubling said cut off sections; means for feeding said doubled sections; movable means operative on said cut and doubled sections one at a time, to stack the same, said feeding, doubling and movable stacking means being adjustable to operate on articles of different sizes.

9. In a cutting and folding machine, the combination with means for folding a strip of material lengthwise; of means for cutting definite lengths from said folded strip; means for doubling the said cut-off lengths; means for feeding said cut-off and doubled lengths to a packing mechanism, said feed means including guide belts co-operating with the lateral ends of said articles; and means for packing said articles in a stack, said guide belts being adjustable toward each other to co-operate with articles of different sizes.

10. In a cutting and folding machine, the combination with means for feeding a strip of material and folding the same lengthwise; of means for cutting off different lengths of said folded strip to form articles; means for doubling said folded lengths to quarter-fold said articles; a pair of movable packer arms co-operating with the lateral sides of said articles to pack the same in a stack; feed belts co-operating with the lateral sides of said articles to convey the same from the doubling mechanism to the packer arms, said feed belts and packer arms being laterally adjustable toward each other to co-operate with articles of different sizes.

11. In a cutting and folding machine, the combination with means for cutting off definite lengths of material from a strip and quarter-folding said lengths of material to produce folded articles; of means for stacking said articles including movable packer elements; means for conveying said articles to said packer elements, including spaced feed belts co-operating with the lateral sides of said articles; guide pulleys for the upper and lower ends of said belts; and means for simultaneously adjusting said upper and lower guide pulleys laterally toward each other to effect adjustment of said belts for co-operation with articles of different sizes.

12. In a cutting and folding machine, the combination with means for feeding a strip of material and folding the same lengthwise; of means for cutting off definite lengths of said folded material to form articles; of means for doubling said folded sections of material; means for feeding said articles to a packing mechanism, including a pair of movable packer blades; supporting means for said blades, said feeding means including a plurality of belts co-operating with the lateral sides of said articles; guide means for the upper and lower ends of said belts, the lower guide means being mounted on the supports for said packer blades; and means for simultaneously adjusting said supports toward each other and said upper guide means laterally toward each other to adjust said feeding means and packer blades for operation on articles of different sizes.

13. In a cutting and folding machine, the combination with means for feeding a strip of material and folding the same lengthwise; of means for cutting definite lengths of material from said folded strip; and folding means for doubling said cut-off lengths, said folding means including folding rollers, an oscillating folder blade and co-operating guide means between which said blade is movable.

14. In a cutting and folding machine, the combination with means for feeding a plurality of strips of material and folding the same lengthwise; of means for guiding said strips side by side; a single cutting element for simultaneously cutting off sections from both of said folded strips; and means for doubling said sections, said means including a movable folding blade and co-operating guides between which said blade is movable, said blade extending across the articles cut from both strips and operative to simultaneously fold said articles to double the same.

15. In a cutting and folding machine, the combination with means for folding a plurality of strips of material lengthwise and feeding said folded strips side by side in the same plane; of means extending across said strips for cutting lengths from the same simultaneously; of means including a single folding blade operative across the path of movement of said cut-off sections for doubling the same, said last-named means operating simultaneously on a plurality of said cut-off sections.

16. In a cutting and folding machine, the combination with means for feeding a strip of material and folding the same lengthwise; of a set of rolls between which said folded strip passes, one of said rolls having a cutting blade thereon; interconnected, interchangeable drive gearing for operating said feed mechanism and rotating said rolls, whereby said feed mechanism and rolls may be driven at different relative speeds to cut different lengths of material from said folded strips, said rolls being so spaced as to permit a certain amount of slippage between the same and the material operated upon.

17. In a machine for cutting and folding articles, the combination with means for continuously feeding a strip of material and folding the same lengthwise; of means for cutting definite lengths from said folded strip; means for doubling said cut-off folded sections, including a reciprocating folder; of means for relatively adjusting the speed of operation of said first named feeding and folding mechanism and said cutting mechanism; and adjustable means for timing the reciprocation of said folder to correspond with the speed of the feeding means to operate on articles of different sizes.

18. In a machine for cutting and folding sheet material, the combination with means for continuously feeding a strip of material and folding the same lengthwise; of relatively adjustable cutting means for cutting off lengths of different sizes; of adjustable folding means for doubling different sizes of cut-off sections; means for stacking said articles, including a receptacle and a reciprocating packing blade; and adjustable means for timing the operation of said packer blade to correspond with the adjustment of the other parts of the machine.

In witness that I claim the foregoing I have hereunto subscribed my name this 9th day of August, 1926.

SAMUEL J. CAMPBELL.